United States Patent [19]

Schneider

[11] Patent Number: 5,163,648
[45] Date of Patent: Nov. 17, 1992

[54] FISHING BAIT BUCKET HOLDER

[76] Inventor: Michael G. Schneider, 1613 Country La., Kaukauna, Wis. 54130

[21] Appl. No.: 599,364

[22] Filed: Oct. 18, 1990

[51] Int. Cl.⁵ .................................. A47G 29/00
[52] U.S. Cl. .................................. 248/154; 43/55; 248/310
[58] Field of Search .............. 248/154, 149, 146, 147, 248/176, 310, 505, 570, 229; 43/54.1, 56, 55

[56] References Cited

U.S. PATENT DOCUMENTS

| | | | |
|---|---|---|---|
| 1,115,656 | 11/1914 | Fritschle. | |
| 1,697,425 | 1/1929 | Hornung. | |
| 2,210,272 | 8/1940 | Turner | 224/29 |
| 2,259,814 | 10/1941 | Green et al. | 43/56 |
| 2,304,810 | 12/1942 | Fetterman | 248/153 |
| 2,487,645 | 11/1949 | Gershon | 43/56 |
| 2,631,807 | 3/1953 | Witt | 248/229 |
| 2,665,868 | 1/1954 | Schmidt | 248/147 |
| 2,967,296 | 12/1954 | Steele | 43/55 |
| 2,968,887 | 1/1961 | Woolworth | 43/56 |
| 2,974,437 | 3/1961 | Stadler | 43/55 |
| 2,985,416 | 5/1961 | Chapman et al. | 248/154 |
| 3,039,224 | 6/1962 | Hartzog | 43/56 |
| 3,064,931 | 11/1962 | Rowe | 248/154 X |
| 3,105,594 | 10/1963 | Ewers | 211/72 |
| 3,144,233 | 8/1964 | Pelley | 248/154 |
| 3,196,576 | 7/1965 | Thomas, Sr. | 43/56 |
| 3,220,140 | 11/1965 | Shirley, Sr. | 43/55 |
| 3,255,986 | 6/1966 | Eadie | 248/147 |
| 3,365,228 | 1/1968 | Hay | 294/31.2 |
| 3,655,158 | 4/1972 | Smith, Jr. | 248/154 |
| 4,671,009 | 6/1987 | Faunce | 43/54.1 |
| 4,744,614 | 5/1988 | Gombosi | 312/242 |

Primary Examiner—Ramon O. Ramirez

[57] ABSTRACT

This invention relates to a fishing bait bucket holding apparatus and method of use, especially in a boat. The apparatus comprises a bracket, for mounting to e.g. a boat, straps to embrace the girth of the bucket and thereby stabilize the bucket against lateral movement with respect to the bracket, and a bucket top holding rod mounted to the bracket and vertically biased to exert a downward force on the top of the bucket or bucket lid. Methods of use of the holding apparatus are also disclosed.

9 Claims, 1 Drawing Sheet

FISHING BAIT BUCKET HOLDER

BACKGROUND OF THE INVENTION

This invention relates to apparatus for holding fishing bait, and especially to apparatus for holding and stabilizing a bucket of fishing bait in a boat.

Typically, fishing bait such as minnows are carried and contained in a bucket of water. The bucket is conventionally placed on the bottom of the boat while using the boat, and while fishing. Especially tapered containers, such as the commonly used styrofoam buckets, tend to be somewhat unstable because the base of the bucket is narrower than the top. In addition, in situations where a light weight (e.g. styrofoam) lid is used, the lid is readily dislodged or blown off the bucket.

Any instability of the bucket, and any tendency toward dislodgement of the lid, are exaggerated by locomotion of the boat and movement of the boat by the waves. In addition, as people move around the boat, the boat can be rocked by the shifting of the weight in the boat, or they can bump the bucket and thereby dislodge the lid or spill the contacts of the bucket.

Such instability of the bucket and the lid due to these and other sources of movement can lead to tipping of the bucket, and spillage of the contents. Since the bait contents (e.g. live minnows) is typically highly perishable, any spillage of especially the bait can readily result in wasting of the bait, in addition to soiling of the boat, and potentially a shortage of bait during any given fishing trip.

Accordingly, it is an object of this invention to provide apparatus adapted to hold and stabilize a fishing bait bucket in a boat.

It is a further object to provide apparatus which can hold the bucket against lateral and tipping movement, as well as holding the bucket against vertical movement, and holding the lid on the bucket, by applying a downward pressure on the top of the bucket.

It is still another object to provide such apparatus which is adjustable to any one of a plurality of ranges of heights such that it can accommodate a variety of ranges of heights of buckets, and apply downward pressure on the tops thereof.

It is still another object to provide methods of holding a bait bucket in a fishing boat by (i) holding the bucket against lateral and optionally tipping movement thereof by means of a bracket mounted to the boat and a girth embracing member secured to the bracket, and (ii) holding the bucket, and any lid thereon, against vertical movement by securing the bracket in the boat such that the base of the bucket rests on a support member such as the boat floor or a bench seat, while a rod, or other holding means attached to the bracket or boat, is biased downwardly against the top of the bucket or the lid, as appropriate.

SUMMARY OF THE DISCLOSURE

Some of the objects are attained in a first family of embodiments comprising fish bait bucket holding apparatus adapted for stable, and readily releasible, securement of a fishing bait bucket in a boat. The apparatus of this first family of embodiments comprises a bracket, girth embracing means, a bucket top holding rod, and a biasing means. The bracket comprises a base member having a generally upright portion thereof, the base member being adapted to cooperate in securing the bracket to a preferably upright surface in a boat, and a generally horizontal bucket support member extending from the base member, and adapted to support the bottom of the bait bucket. The girth embracing means is attached to the bracket and is adapted to embrace a bait bucket between the top of the bucket and the bottom of the bucket, and to thereby releasibly secure the bucket against lateral movement of the bucket relative to the bracket. The bucket top holding rod is mounted to the bracket, and comprises a first portion thereof extending along the base of the bracket, and a second bucket contacting portion thereof extending in a direction disposed generally away from the base of the bracket, the first portion of the rod being mounted to the bracket such that the rod can pivot about an axis extending through the first portion thereof, and can thereby rotate the bucket top holding rod such that the second bucket contacting portion thereof can be selectively (i) positioned over a bucket retained to the holding apparatus to thereby hold the bucket against vertical movement of the bucket with respect to the bracket, and (ii) positioned off the bucket whereby the lid or the bucket, as appropriate, is susceptible to vertical movement with respect to the bracket. The biasing means biases the bucket top holding rod with respect to the bracket, whereby the bucket contacting portion of the bucket top holding rod is resiliently urged against the top of the bucket.

The bucket holding apparatus preferably includes an interface for selecting and employing one of a plurality of ranges of heights within which the bucket contacting portion of the rod can operate.

Other objects of the invention are attained in a second family of embodiments comprising fish bait bucket holding apparatus for stable, and readily releasible, securement of fishing bait buckets in a boat, the holding apparatus comprising a bracket; a girth embracing means; attached to the bracket, the girth embracing means being adapted to embrace a bait bucket between the top of the bucket and the bottom of the bucket, and to thereby releasibly secure the bucket against lateral movement thereof relative to the bracket; a bucket top holding rod, as in the first family of embodiments, likewise mounted to the bracket; interface means for selecting and employing one of a plurality of ranges of heights within which the bucket contacting portion can operate; and biasing means biasing the bucket top holding rod with respect to the bracket. In this second family of embodiments, the fish bait bucket holding apparatus is adapted to receive and hold a bait bucket having any one of a variety of heights, within the plurality of ranges of heights, to hold the selected bucket against lateral tipping, and vertical movement with respect to the bracket, and to readily release the selected bucket.

The invention further contemplates a boat comprising either one of the above two families of fish bait bucket holding apparatus mounted thereto for securement of a bait bucket to the apparatus and thus to the boat. With respect to the second family, the boat preferably has a floor or other horizontally disposed member, the holding apparatus being positioned relative to the horizontally disposed member of the boat such that a bucket positioned in the holding apparatus can be cooperatively supported at the bottom of the bucket by the horizontally disposed member while the bucket contacting portion of the rod is biased downwardly against the top of the bucket.

The invention further comprehends a method of releasibly securing a fishing bait bucket in a boat. The method comprises the steps of securing to the boat, on the inside thereof, a fish bait bucket holding apparatus comprising (i) a bracket, (ii) a girth embracing means attached to the bracket, (iii) a bucket top holding rod mounted to the bracket, and (iv) biasing means adapted to exert a biasing force on the bucket top holding rod with respect to the bracket, the securing including positioning the bucket holding apparatus over a support such that when the bait bucket is supported by the support and held against lateral movement by the bucket holding apparatus, a portion of the bucket top holding rod can be biased against the top of the bait bucket; placing the bait bucket on the support; embracing the bucket with the girth embracing means, and thereby securing the bucket against lateral and, preferably, tipping movement with respect to the bracket; lifting the bucket top holding rod against the biasing force of the biasing means such that the bucket contacting portion thereof can be rotated over the bucket; rotating the bucket top holding rod such that the bucket contacting portion thereof is over the bucket; and releasing the bucket top holding rod, whereby the bucket contacting portion of the bucket top holding rod moves into contact with the top of the bait bucket and exerts a downward force thereon.

The method preferably includes selecting, as the support, a horizontally disposed structural member of the boat, such as the floor, a seat bench, or the like.

DETAILED DESCRIPTION OF THE ILLUSTRATED EMBODIMENTS

Figure 1:
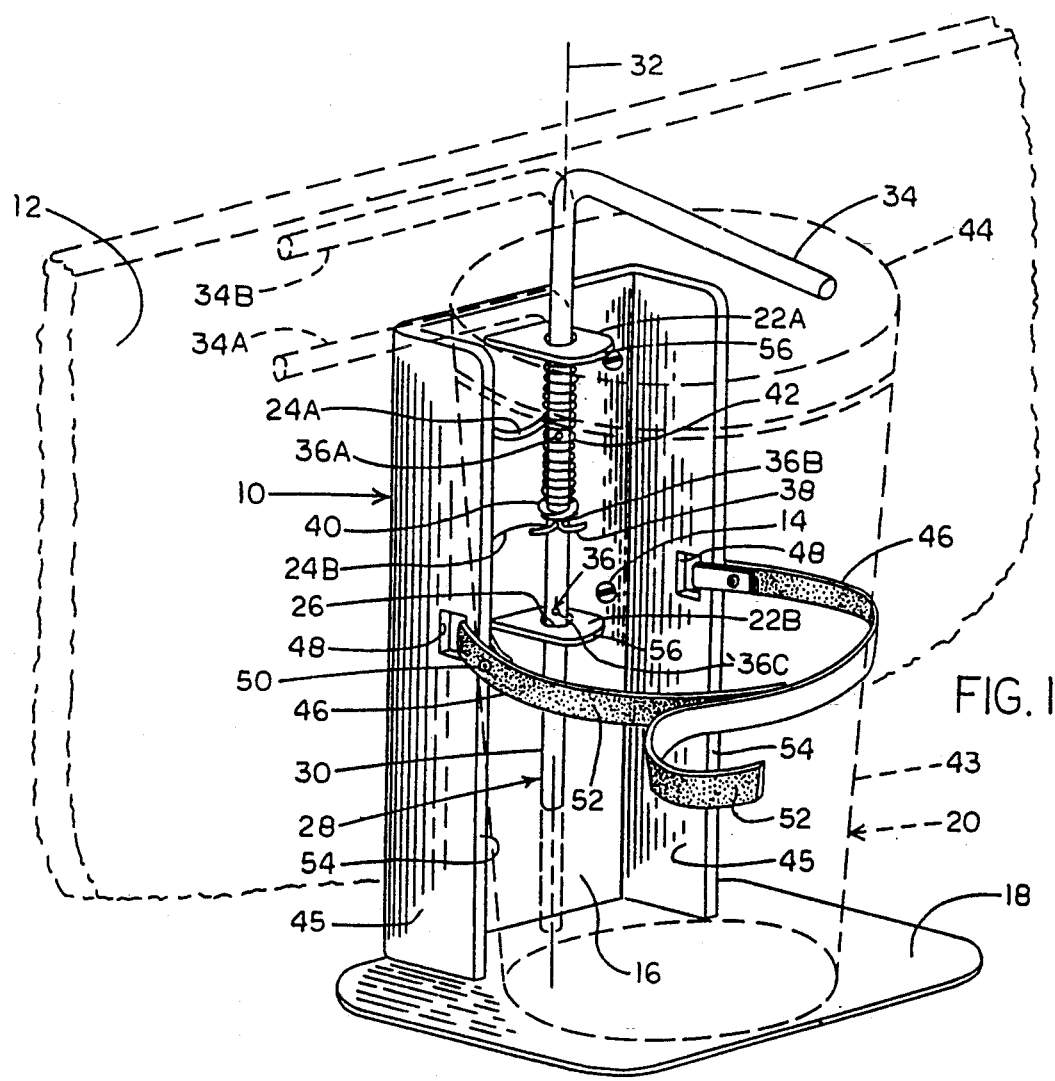
FIG. 1 shows a pictorial view of a first bait bucket holding apparatus of the invention, mounted in a boat.

Referring to FIG. 1, a bracket 10, made of metal, plastic, or the like, is mounted to the inside of the boat hull 12 by means of a plurality of screws 14. The bracket 10 comprises a base member 16 and a generally horizontal bucket support member 18 connected to and extending from the base member 16, which support member 18 supports bucket 20 (shown in phantom). A pair of punched horizontal flanges 22A and 22B extend from base member 16, leaving corresponding holes 24A and 24B in base member 16. Flanges 22A and 22B have holes 26 which receive bucket top holding rod 28.

Bucket top holding rod 28 and holes 26 are cooperatively sized such that holes 26 serve to align, guide, and hold a first lower portion 30 of the rod 28 which extends along the base member 16 of the bracket, and which lower portion 30 slides freely in holes 26 along a generally vertical axis 32 which extends through the first lower portion 30 of the rod. The rod 28 further comprises an upper bucket contacting portion 34, which extends in a direction disposed generally away from the base member 16, and is adapted for contacting the top of the bucket 20 which is being held.

The lower portion 30 of the rod 28 has a plurality of holes 36A, 36B, 36C spaced generally along axis 32. Hole 36B has a cotter pin 38 extending therethrough. Cotter pin 38 supports a washer 40 which in turn supports compression spring 42, spring 42 being confined between washer 40 and the lower surface of flange 22A.

Bucket top holding rod 28 can be lifted vertically against the biasing force of compression spring 42 to the limit allowed by the compression of the spring between washer 40 and flange 22A. Bucket top holding rod 28 can also be rotated about vertical axis 32, whereby the upper bucket contacting portion 34 of the rod can be rotated over the bucket as shown in FIG. 1 whereupon, when the rod is released from the lifting force, bucket contacting portion 34 is urged, by spring 42, into contact with the top of the bucket. Bucket contacting portion 34 contacts the lid 44, if a lid is used, or contacts a top member of the receptacle 43 of the bucket if a lid is not used. In any event, the downward bias provided by spring 42 applies a downwardly directed force to the top of the bucket by means of bucket top holding rod 28, whereby the bucket, and lid if used are held against vertical movement.

Bracket 10 further comprises a pair of generally vertical flanges 45 which extend outwardly from base member 16 in generally the same direction as punched flanges 22A and 22B.

A pair of girth embracing straps 46 are secured to flanges 45, through holes 48, and embrace bucket 20, thereby securing the bucket to bracket 10 and holding the bucket against lateral movement and against tipping with respect to bracket 10. Straps 46 are preferably permanently secured in holes 48 by rivets 50 or other permanent securing means. Temporary securing means is acceptable so long as inadvertent release of straps 46 from holes 48 can be controlled. Straps 46 further comprise means for being secured together while they embrace the girth of a bucket as shown. A preferred securing means is provided by using on straps 46 a material having closely spaced hooks and loops, and commonly known as Velcro, indicated at 52 in the drawings, whereby the straps can be securely and releasibly attached to each other as they embrace the girth of the bucket. When using a material like Velcro for the straps 46, the length of the combined straps as they embrace the girth of the bucket can be adjusted at will, in an infinite number of increments, which adapts well to a variety of bucket girth sizes, up to the longest combined length of the straps which can still be held together. And since bait buckets having a variety of girth sizes are available, it is preferred that straps 46 be adapted to be adjustable in their combined length to so accommodate the variety of girth sizes. Other adjustable securing means may, of course, be used, such as buttons, buckle and holes, snaps, and the like, although such securements generally provide fewer possible increments of length of adjustment, and so are less preferred. Further, straps 46 can be replaced by a single strap which extends between the two holes 48 with sufficient length to embrace the girth of a bucket, the strap having suitable securement means at both holes 48, and sufficient capacity for length adjustment to accommodate the desired range of sizes of bucket girths. Whether single or double, straps 46 can be made with a resiliently extensible material, having elasticity, whereby the elasticity assists in providing secure holding of the bucket to bracket 10, along with a degree of resiliency in the holding. Also, length adjustment of the straps is not necessary in the broadest contemplated embodiments of the invention, but adjustment is preferred.

The bait bucket holding apparatus of this invention is generally operated as follows. The use of the bait bucket holding apparatus of this invention is preferably preceded by mounting the apparatus in the boat by use of screws 14 or the like, which screws extend through holes (not shown) in base member 16 of bracket 10, and into the wall of the boat. Preferably the bracket is mounted to a vertical wall 12 in the boat as shown in the drawings. The bracket can, in the alternative, be mounted to a wall which is not vertical, by using adaptation apparatus (not shown) which may or may not be part of bracket 10, and which securely holds the bracket 10 in a generally upright attitude as shown.

Rod 28 is rotated, if necessary, such that the upper bucket contacting portion 34 thereof is more or less parallel to the plane defined by bracket base member 16. The thus rotated position of bucket contacting portion 34 is shown in dashed outline at 34A, against boat wall 12, in FIG. 1.

Straps 46 are released from each other if not already released. The bait bucket 20 is then placed on support 18 with the outside surface of the bucket generally in light contact with the outer edges 54 of upstanding flange 45. Flanges 45 preferably extend far enough away from bracket base member 16, relative to flanges 22A and 22B, that the outer surface of the bucket, defined by the curvature of the bucket, will not press against the outer edges 56 of flanges 22A and 22B when the outside surface of the bucket is in light contact with both outer edges 54. Accordingly, outer edges 54 of flanges 45 are spaced farther away from base member 16 than are the outer edges 56 of flanges 22A and 22B.

With the bucket thus positioned against edges 54 of the bracket 10, the girth embracing straps are wrapped firmly around the bucket and are secured to each other to so securely hold the bucket against lateral movement. By placing holes 48 generally at or above the typical center of gravity of the bucket, including the contents of the bucket, and by securement of straps 46 to the holes, and to each other about the bucket generally at or above the typical center of gravity of the bucket, including contents, as shown in the drawings, the bucket is typically restrained by straps 46 against tipping as well as against lateral movement, with respect to bracket 10.

With the bucket in place, cotter pin 38 is placed in an appropriate one of holes 36A, 36B, or 36C, between flanges 22A and 22B, and below washer 40, whereby bucket contacting portion 34 can be raised high enough to be rotated over the bucket, accompanied by a downward biasing force being applied on the rod by spring 42 when bucket contacting portion 34 contacts the top of the bucket. The combination of cotter pin 38, and holes 36A, 36B, 36C thus functions to establish an interface, between the bracket 10 and the rod 28, that can be used to select the range of heights within which the bucket top contacting rod will operate. Namely, the low end of the range is determined as the rod drops down, without a bucket in place, such that cotter pin 38 rests on the top of flange 22B. The height of the bucket contacting portion 34 at that point is determined by which hole (36A, 36B, or 36C) the cotter pin is in. The high end of the range is defined by the limit to which spring 42 can be compressed against the bottom of flange 22A as the rod 28 is lifted against the biasing force of the spring. A higher range of heights (higher high end and higher low end) can be achieved by placing cotter pin 38 in hole 36C, rather than hole 36B. A lower range of heights is achieved by placing cotter pin 38 in hole 36A. Accordingly, a first coarse adjustment of the height of the rod 28 is made by placing cotter pin 38 in one of holes 36A, 36B, or 36C.

Figure 2:
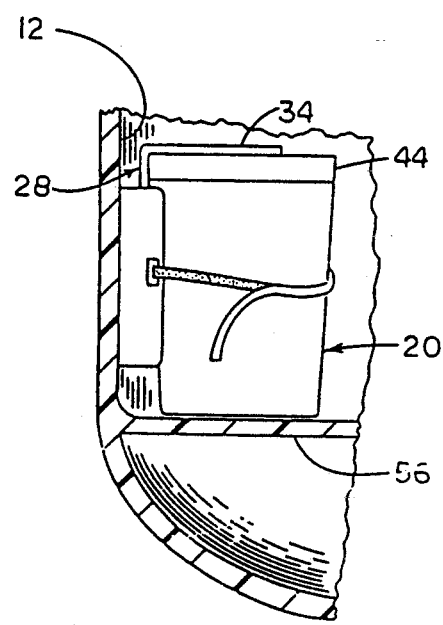
FIG. 2 shows a side view of a second bait bucket holding apparatus of the invention, including a bucket held therein, all held in a boat which is shown in fragmentary cross-section.

With cotter pin 38 in place, the rod is lifted high enough that the bucket contacting portion 34 can be rotated over the top of the bucket. Such position is seen in phantom at 34B in FIG. 1. The rod is then so rotated, and released, whereby the biasing force of spring 42 urges the bucket contacting portion 34 downwardly onto, and into contact with, the top of the bucket. As shown in FIGS. 1 and 2, the bucket contacting portion 34 contacts lid 44, thus applying a downwardly directed force on the lid and bucket.

With the straps 46 thus secured around the girth of the bucket, and the rod 28 holding down on the top of the bucket, the bucket is securely held in place. But such securement can be readily reversed. The user can gain access to the contents of the bucket by rotating rod 28 off the bucket, thereby returning it to position 34A or 34B whereupon lid 44 is released and can be readily removed. After accessing the contents of the bucket, or as desired, the rod 28 can again be rotated over the bucket and the bucket is again held as shown. The entire bucket is readily released from the holder by (i) rotating the rod 28 to position 34A or 34B and (ii) unfastening straps 46 from each other in well known manner. The bucket is then freely removed from the holding apparatus. In some cases, the bucket can be removed from the holding apparatus without unfastening of straps 46. In such cases, the straps 46 are generally not elastic, and are not resiliently stretched, and the bucket is preferably tapered, from top to bottom as shown.

FIG. 2 illustrates a second family of embodiments of the holding apparatus of this invention wherein the task of supporting the weight of the bucket (which is performed by support member 18 in FIG. 1) is performed by a horizontally disposed member of the boat, namely floor 58 which depends from wall 12 which, as seen in FIG. 2, is generally illustrated as the hull of the boat. In this family, the support for bucket 20 can be provided by an horizontally-disposed member of the boat.

By "horizontally-disposed member" I mean any member which, in combination with the restraining forces of straps 46, rod 28, cotter pin 38, and spring 42, can provide support for the weight of the bucket when the bucket is in an upright orientation, and wherein at least 25% of the weight of the bucket is transferred to the horizontally-disposed member when the bucket is in an upright orientation.

With respect to the embodiment of FIG. 2, the placement of bracket 10 is restricted more than the placement of bracket 10 is restricted with respect to the embodiment of FIG. 1 in that, in FIG. 2, the bracket is positioned vertically with respect to floor 58 such that there is vertical cooperation, including cooperation by location, between (i) the vertical support provided to the bucket receptacle 43 by floor 58 and (ii) the downward urging of rod 28 on lid 44, according to the downward biasing force of spring 42. Accordingly, the bucket 20, comprising receptacle 43 and lid 44, is firmly held between the rod 28 and the floor 58.

When a different bucket, having a different height, corresponding to a different one of the ranges of heights, is to be used, cotter pin 38 is pulled, and placed in a different, appropriate one of the holes 36 on rod 28. The different bucket is then secured to the holding apparatus using the above described steps.

It is to be understood that rod 28 can be tubular rather than solid as shown, and can assume shapes other than the round cross-section shown.

Compression spring 42 can be replaced by an extension spring, along with provision of appropriate means to attach the extension spring to rod 28 and e.g. flange 22B, whereby the extension spring will perform the same function as compression spring 42, generally the same way, to achieve substantially the same result. Accordingly, an extension spring is included within the definition of "biasing means."

Thus the invention provides apparatus adapted to hold and stabilize a fishing bait bucket in a boat.

The invention further provides apparatus which can hold the bucket against lateral and tipping movement, as well as holding the bucket against vertical movement, and holding the lid on the bucket, by applying downward pressure on the top of the bucket.

Yet further, the invention provides such apparatus which is adjustable to any one of a plurality of ranges of heights such that the apparatus can accommodate a variety of ranges of heights of buckets, and apply downward pressure on the tops thereof.

The invention also provides methods of holding a bait bucket in a fishing boat by (i) holding the bucket against lateral and optionally tipping movement thereof by means of a bracket mounted to the boat and a girth embracing member secured to the bracket, and (ii) holding the bucket, and any lid thereon, against vertical movement by securing the bracket in the boat such that the base of the bucket rests on a support member such as a support member extending from the base of the bracket, the boat floor or a bench seat, while a rod or other holding means, attached to the bracket or boat, is biased downwardly against the top of the bucket or the lid, as appropriate.

Accordingly, preferred embodiments of the invention have been illustrated and described. Those skilled in the art will now see that certain modifications can be made to the fish bait bucket holding apparatus herein disclosed with respect to the preferred embodiments, without departing from the spirit of the instant invention, and while the invention has been described above with respect to its preferred embodiments, it will be understood that the invention is capable of numerous rearrangements, modifications and alterations, and all such arrangements, modifications and alterations are intended to be within the scope of the appended claims.

Having thus described the invention, what is claimed is:

1. Fish bait bucket holding apparatus for stable and readily releasible securement of a fishing bait bucket in a boat, said apparatus comprising:
   (a) a bracket, said bracket comprising
      (i) a base member, said base member having a generally upright portion thereof, said base member being adapted to cooperate in securing said bracket to a surface in a boat,
      (ii) a generally horizontal bucket support member extending from said base member, and adapted to support the bottom of a bait bucket;
   (b) girth embracing means, attached to said bracket, said girth embracing means being adapted to embrace a bait bucket between the top and bottom thereof, and to thereby releasibly secure the bucket against lateral movement thereof relative to said bracket;
   (c) a bucket top holding rod mounted to said bracket, said bucket top holding rod comprising a first portion thereof extending along said base of said bracket, and a second bucket contacting portion thereof extending in a direction disposed generally away from said base of said bracket, said first portion of said rod being mounted to said bracket such that said rod can pivot about an axis extending through said first portion thereof, and can thereby rotate said bucket top holding rod such that said second bucket contacting portion thereof can be selectively (i) positioned over a bucket retained to said holding apparatus to thereby hold the bucket against vertical movement thereof with respect to said bracket, and (ii) positioned off a bucket retained to said apparatus whereby, after said bucket contacting portion is positioned off the bucket, the bucket is susceptible to vertical movement with respect to said bracket; and
   (d) biasing means biasing said bucket top holding rod with respect to said bracket, whereby said bucket contacting portion of said bucket top holding rod is resiliently urged against the top of a bucket held in said apparatus.

2. Fish bait bucket holding apparatus as in claim 1, and including interface means for selecting and employing one of a plurality of ranges of heights within which said bucket contacting portion can operate.

3. The combination of a boat and the fish bait bucket holding apparatus of claim 1 mounted thereto for securement of a bait bucket to said apparatus.

4. The combination of a boat and the fish bait bucket holding apparatus of claim 2 mounted thereto for securement of a bait bucket to said apparatus.

5. Fish bait bucket holding apparatus for stable and readily releasible securement of fishing bait buckets in a boat, said holding apparatus comprising:
   (a) a bracket;
   (b) a girth embracing means, attached to said bracket, said girth embracing means being adapted to embrace a bait bucket between the top and bottom thereof, and to releasibly secure the bucket against lateral movement thereof relative to said bracket;
   (c) a bucket top holding rod mounted to said bracket, said bucket top holding rod comprising a first portion thereof extending along said base of said bracket, and a second bucket contacting portion thereof extending in a direction disposed generally away from said base of said bracket, said first portion of said rod being mounted to said bracket such that said rod can pivot about an axis extending through said first portion thereof, and can thereby rotate said holding rod such that said second bucket contacting portion thereof can be selectively (i) positioned over a bucket retained to said holding apparatus to thereby hold the bucket against vertical movement thereof with respect to said bracket, and (ii) positioned off a bucket retained to said apparatus whereby, after said bucket contacting portion is positioned off the bucket, the bucket is susceptible to vertical movement with respect to said bracket;
   (d) interface means for selecting and establishing one of a plurality of ranges of heights within which said bucket contacting portion can operate; and
   (e) biasing means adapted to exert a biasing force against said bucket top holding rod with respect to said bracket, whereby said fish bait bucket holding apparatus is adapted to receive and hold a bait bucket having any one of a variety of heights, to hold the selected bucket against lateral and vertical movement with respect to said bracket, and to readily release the selected bucket.

6. The combination of a boat and the fish bait bucket holding apparatus of claim 5 mounted thereto for securement of a bait bucket to said apparatus, said boat having a horizontally-disposed member, said holding apparatus being positioned relative to said horizontally disposed member of said boat such that a bucket positioned in said holding apparatus can be cooperatively supported at the bottom of the bucket by said horizontally disposed member of said boat while said bucket contacting portion of said rod is biased downwardly against the top of the bucket.

7. A method of releasibly securing a fishing bait bucket in a boat, said method comprising the steps of:
(a) securing to said boat, on the inside thereof, a fish bait bucket holding apparatus, said apparatus comprising (i) a bracket, (ii) a girth embracing means attached to said bracket, (iii) a bucket top holding rod mounted to said bracket, and (iv) biasing means adapted to exert biasing force against said bucket top holding rod with respect to said bracket, said securing including positioning said bucket holding apparatus over a support such that when said bait bucket is supported by said support and held against lateral movement by said bucket holding apparatus, a portion of said bucket top holding rod can be biased against the top of said bait bucket;
(b) placing said bait bucket on said support;
(c) embracing said bucket with said girth embracing means, and thereby securing said bucket against lateral movement with respect to said bracket;
(d) lifting said bucket top holding rod against the resistance of said biasing means such that said bucket contacting portion of said rod can be rotated over said bucket;
(e) rotating said bucket top holding rod such that said bucket contacting portion thereof is over said bucket; and
(f) releasing said bucket top holding rod, whereby said bucket contacting portion of said bucket top holding rod moves into contact with said top of said bait bucket and exerts a downward force thereon.

8. A method as in claim 7 and including selecting, as said support, a horizontally disposed member of said boat.

9. A method as in claim 7 wherein said bait bucket holding apparatus comprises interface means for selecting and establishing one of a plurality of ranges of heights within which said bucket contacting portion can operate, and including, prior to said lifting, rotating, and releasing steps (d), (e), or (f) respectively, the step of selecting and establishing one of said plurality of ranges of heights, within which said bucket contacting portion does operate during said lifting, rotating, and releasing steps.

* * * * *